(12) United States Patent
Matze et al.

(10) Patent No.: US 7,444,465 B2
(45) Date of Patent: Oct. 28, 2008

(54) TAPE EMULATING DISK BASED STORAGE SYSTEM AND METHOD

(75) Inventors: John E. Matze, Poway, CA (US); Michael H. Reider, Escondido, CA (US); Kenneth David Geist, San Diego, CA (US); Daniel Morag Davies, San Diego, CA (US)

(73) Assignee: Overland Storage, Inc., San Diego, CA (US)

( * ) Notice: Subject to any disclaimer, the term of this patent is extended or adjusted under 35 U.S.C. 154(b) by 198 days.

(21) Appl. No.: 11/215,740

(22) Filed: Aug. 30, 2005

(65) Prior Publication Data

US 2006/0143376 A1 Jun. 29, 2006

Related U.S. Application Data

(63) Continuation-in-part of application No. 10/943,779, filed on Sep. 17, 2004.
(60) Provisional application No. 60/605,894, filed on Aug. 30, 2004, provisional application No. 60/605,890, filed on Aug. 31, 2004.

(51) Int. Cl.
*G06F 12/00* (2006.01)
(52) U.S. Cl. ............... 711/111; 711/162; 711/170
(58) Field of Classification Search .......... 711/111, 711/162, 170
See application file for complete search history.

(56) References Cited

U.S. PATENT DOCUMENTS

| | | | |
|---|---|---|---|
| 4,467,421 A | 8/1984 | White et al. | |
| 6,070,224 A | 5/2000 | LeCrone et al. | |
| 6,260,110 B1 | 7/2001 | LeCrone et al. | |
| 6,640,278 B1* | 10/2003 | Nolan et al. | 711/6 |
| 6,718,427 B1* | 4/2004 | Carlson et al. | 711/5 |
| 7,200,546 B1* | 4/2007 | Nourmohamadian et al. | 703/24 |
| 2003/0037211 A1* | 2/2003 | Winokur | 711/162 |
| 2003/0070056 A1 | 4/2003 | Greco | |
| 2004/0030668 A1 | 2/2004 | Pawlowski et al. | |
| 2004/0034811 A1 | 2/2004 | Trimmer et al. | |
| 2004/0044842 A1 | 3/2004 | Trimmer et al. | |
| 2004/0111251 A1 | 6/2004 | Trimmer et al. | |
| 2004/0153614 A1 | 8/2004 | Bitner et al. | |
| 2005/0033911 A1* | 2/2005 | Kitamura et al. | 711/111 |

\* cited by examiner

*Primary Examiner*—Reba I Elmore
(74) *Attorney, Agent, or Firm*—Knobbe Martens Olson & Bear LLP (57) ABSTRACT

A data protection and storage system includes an array of disk drives for data storage. Data is received for storage on the disk drive via an interface that is configured to emulate a tape drive interface. A virtual tape data structure is created and stored on the disk drives. The data structure includes entry tables that form a linked list where each contain links to other entry tables and information defining data storage sectors allocated to records associates a virtual tape.

10 Claims, 8 Drawing Sheets

TAPE EMULATING DISK BASED STORAGE SYSTEM AND METHOD

CROSS REFERENCE TO RELATED APPLICATIONS

This application claims priority under 35 U.S.C. 119(e) to U.S. Provisional Application No. 60/605,894 filed on Aug. 30, 2004 and to U.S. Provisional Application No. 60/605,890 filed on Aug. 31, 2004. This application is a continuation-in-part of U.S. patent application Ser. No. 10/943,779 filed on Sep. 17, 2004. Each of these applications is incorporated by reference in its entirety.

BACKGROUND OF THE INVENTION

1. Field of the Invention

This invention relates to systems and methods for storing electronic data and has applicability to enterprise data backup systems.

2. Description of the Related Art

Improving backup and restoring performance is a continuing desire of enterprise data managers. In a typical computing environment, magnetic disk drives are used as the primary storage mechanism for active data, whereas magnetic tapes are used for data backup and archive. The magnetic disks provide rapid and reliable access to data, but they are perceived as being more expensive. In addition, since they are non-removable, they are at risk of physical disasters. Magnetic tape storage is perceived as being less expensive and, because tape cartridges are removable, they can be moved to offsite locations to protect against physical disasters. Therefore, most backup software in use has been optimized for use with magnetic tape technology.

Reading and writing data on a tape requires that the reel be unwound until the desired location is found. Once in the appropriate location the read or write operation can begin. Because of the mechanical nature of this access, read and write operations are slow and often fail. In many situations, it would be beneficial to provide the random access speed and the reliability of a magnetic disk drive to backup systems while still allowing for the possibility of offsite storage. As a result, a new category of magnetic disk systems is becoming popular called virtual tape technology.

Virtual tape systems are magnetic disk systems that transparently emulate a tape drive or a tape library. They provide the same physical connections to a host, such as SCSI, Fibre Channel or Ethernet. This allows them to connect in the same way as the tape systems they are replacing or augmenting. They also provide the same logical response to tape commands, which allows the same backup software to remain in use. The emulator must also be able to send the host computer expected tape-drive interrupt signals such as beginning-of-tape, end-of-tape, and inter-record-gap. In this case, such a system can plug right in to an existing tape based storage system without a need for the user to change his storage network or software environment.

Although such systems have been successful in the marketplace, the currently available devices still do not fully take advantage of the properties of disk storage in a way that provides maximum flexibility and usefulness.

SUMMARY OF THE INVENTION

In one embodiment, a data storage system comprises at least one hard disk drive comprising a magnetic data storage area partitioned into a plurality of data storage sectors. At least one data storage sector stores virtual tape header data comprising information defining data storage sectors allocated to a virtual tape. At least one data storage sector allocated to the virtual tape stores an entry table comprising information defining data storage sectors allocated to one or more individual records associated with the virtual tape. In addition, at least one data storage sector allocated to the individual data records stores at least some of the one or more individual data records.

In another embodiment, a method of appending a record to a virtual tape comprises loading virtual tape header information from a data field stored on a hard disk drive and reading the total number of logical blocks stored on the virtual tape from the header. A current block number is set as one plus the total number of logical blocks stored on the virtual tape, and a current sector of the virtual tape is set to an end of data sector stored in the header. The method continues by reading a current entry table specified in the header, allocating an entry in the current entry table for use, and writing a data record on sectors defined by the allocated entry.

In another embodiment, a method of reading or writing over a desired data record at a desired block number on a virtual tape comprises first determining data storage sectors associated with the block. The determining comprises reading a current entry table defining stored block numbers associated with the entry table, updating the current entry table with a previous or subsequent entry table if the desired block number is not associated with the current entry table, repeating the reading and updating until an entry table associated with the desired block number is stored as the current entry table, and reading the current entry table to identify the sectors. The method continues by reading or writing over one or more of the data storage sectors.

In yet another embodiment, a method of emulating data storage on a magnetic tape media using one or more hard disk drives comprises allocating a set of logical sectors of the one or more hard disk drives to a virtual tape and allocating a first subset of the set of logical sectors to at least one table. The at least one table stores information allocating a second subset of the set of logical sectors to data records stored on the virtual tape.

DETAILED DESCRIPTION OF THE PREFERRED EMBODIMENTS

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
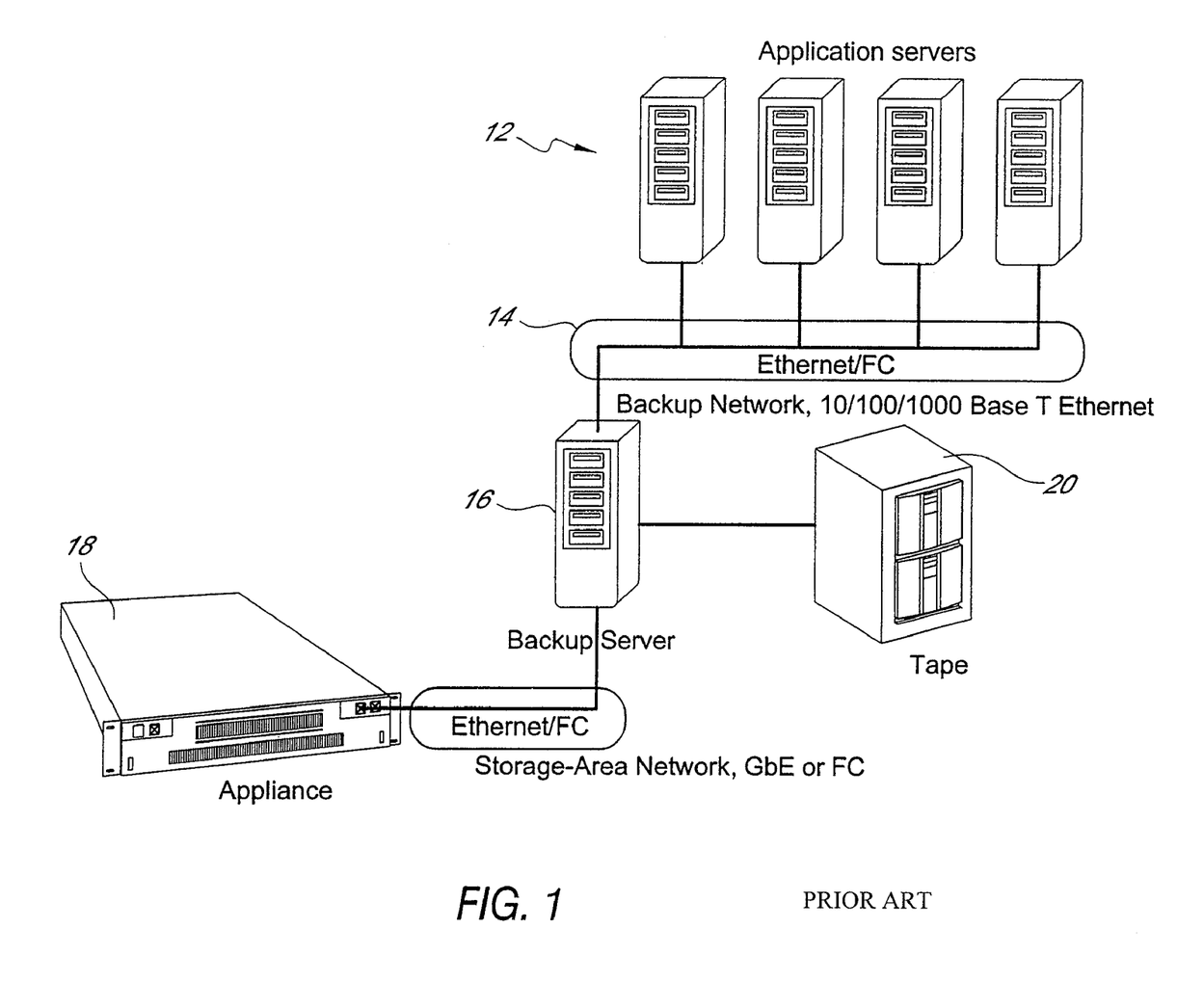
FIG. 1 is a schematic of one embodiment of a data backup system in which the invention may advantageously be used.

FIG. 1 illustrates one example of a commercially available hard disk based appliance with tape emulation features that can be used in a data protection environment. In this system, application servers 12 are connected to each other and to a backup server 16 over a network 14. The backup server 16 is connected to a tape drive or tape library 20, as well as another appliance 18 that contains one or more disk drives for data storage. In operation, the backup server receives data to be backed up from application servers 12, and routes that data to the appliance 18 that contains hard disk based storage. Later, that data may be moved by the backup server 16 from the appliance 18 to one or more tapes using the tape system 20. It will be appreciated that the hardware components, functionality, and software present in the backup server 16, disk appliance 18, and tape drive/library can be combined and/or separated in various ways. For example, the disks of appliance 18 can be located in a separate device. As another example, the tape drive/library 20 hardware and functions can be integral with the disk appliance 18 rather than provided as a separate unit.

As described above, the appliance 18 can be configured to interact with the backup server 16 in exactly the same manner and format of communication as the tape drive/library 20. In this way, software on the backup server 16 that is configured to communicate and store data using tape commands and tape data formats can utilize the disk based appliance 18 without modification. Speed is still improved in many cases such as restore operations, however, because tape commands such as moving to a desired block can be accomplished on disk with the virtual tape much faster than a physical tape cartridge in a physical tape drive.

Figure 2:
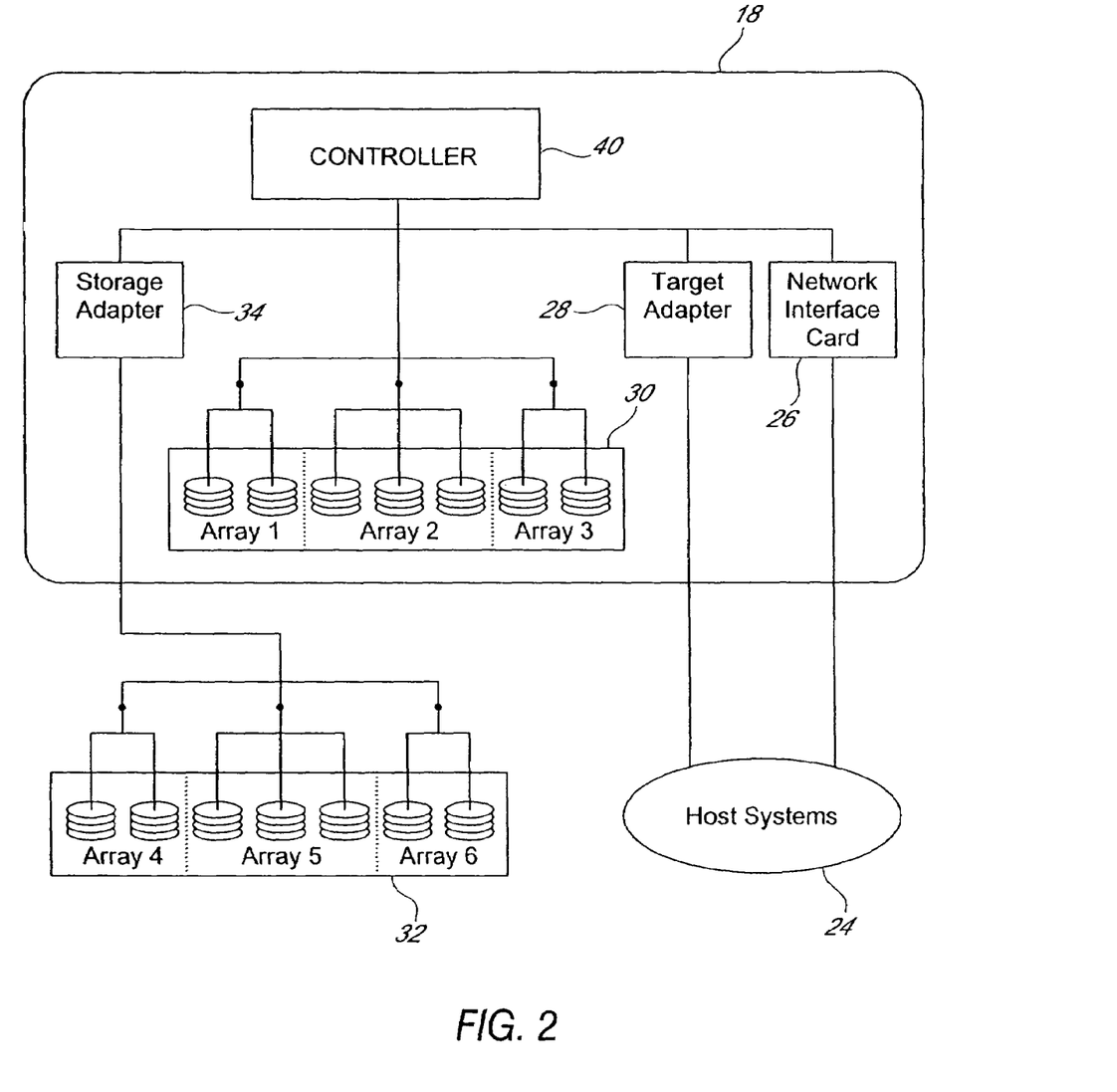
FIG. 2 is an illustration of one embodiment of the backup appliance of FIG. 1.

FIG. 2 illustrates some of the internal hardware components of one embodiment of the appliance 18 of FIG. 1. The appliance 18 connects to host systems 24 (which may, for example, include a backup server 16 as shown in FIG. 1) via one or more of a network interface card 26 or target adapter card 28. The network interface card 26 is typically an Ethernet card, and the target adapter card 28 is typically configured as a Fibre Channel or SCSI interface as is well known in the art, but it will be appreciated that any data communication interface or protocol could be used.

The appliance 18 may also include an internal disk drive array 30, and may alternatively or additionally connect to an external disk drive array 32 through a storage adapter 34 which may, for example, be configured as a Fibre Channel or SCSI interface.

The operation of the system is controlled by a storage controller 40 that defines how the appliance communicates with the host systems 24 and how data received from the host systems 24 is stored on the drive arrays 30, 32. In advantageous embodiments, the storage controller 40 configures the appliance to present a set of "virtual" storage devices to the host systems 24 that are different in number, size, and type than the actual physical set of disk drives (e.g. eight 250 GB SATA hard drives) present in the appliance 18 drive array(s) 30, 32. This is illustrated in more detail in FIG. 3. Referring now to this Figure, the present invention may advantageously be implemented in a storage appliance incorporating a virtualization layer that establishes the externally presented characteristics of the storage appliance.

Figure 3:
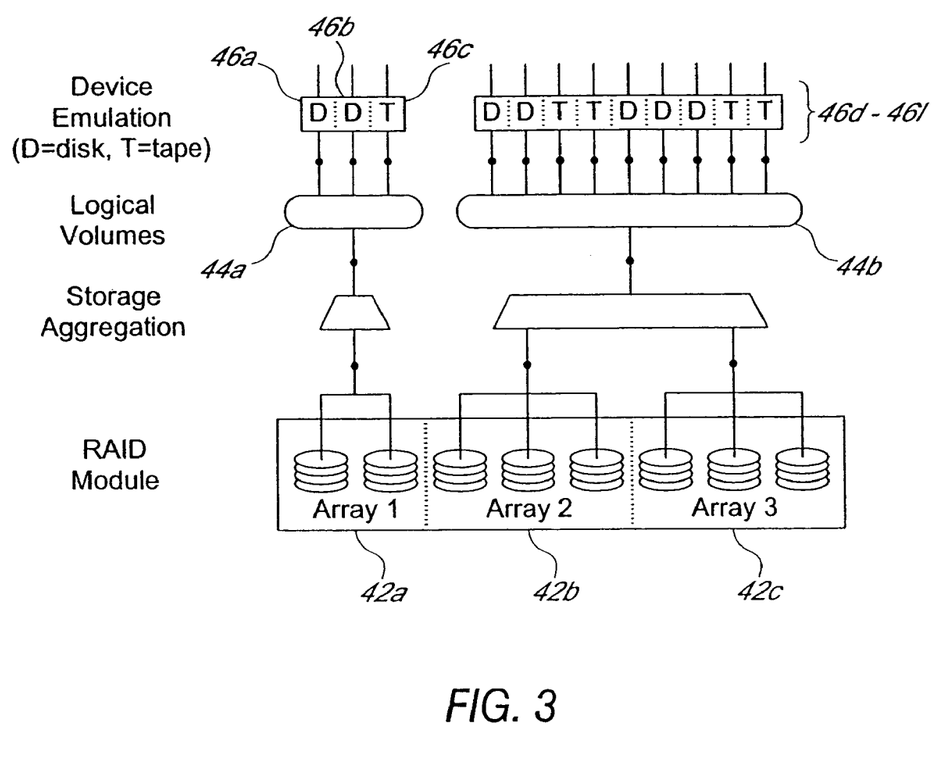
FIG. 3 is a functional block diagram of one embodiment of the backup appliance of FIGS. 1 and 2.

The physical set of disk targets form one or more RAID modules 42a, 42b, 42c. As described above, each RAID module could be internal or external to the storage appliance 18. These disk array targets are grouped together, typically corresponding to subsets with the same level of redundancy, and the storage within each group may be aggregated to form a single virtual storage repository, referred to as a volume group 44a, 44b. These volume groups can then be partitioned into virtual volumes that are presented externally as storage targets 46a-46l, also referred to as logical units. The logical units can be created with any size up to the size of the corresponding volume group they are associated with, and after creation the size can be adjusted. Each logical unit can be configured to emulate a SCSI disk drive or a SCSI tape drive. These logical units can then be accessed using a variety of protocols. For illustrative purposes, we will consider the case where a block protocol such as iSCSI, SCSI or FC is used to access a logical unit configured to simulate a tape drive.

Due to the different access methods of tape and disk drives, storing data on disks that is originally received from a host using tape storage protocols poses some difficulties. Because tape is sequential access and disk is random access, some degree of translation is necessary. Furthermore, data on disks is stored in fixed length sectors or blocks, which are normally 512 or 1024 bytes in length. Data on a tape consists of a series of records (sometimes referred to as logical blocks) of fixed or variable length, sequentially recorded along the length of the tape. The records usually are sequentially numbered and are separated by inter-record gaps that mark the boundary between two adjacent blocks. Additionally, special patterns called "file marks" are used to mark the boundary between backup sets.

Figure 4:
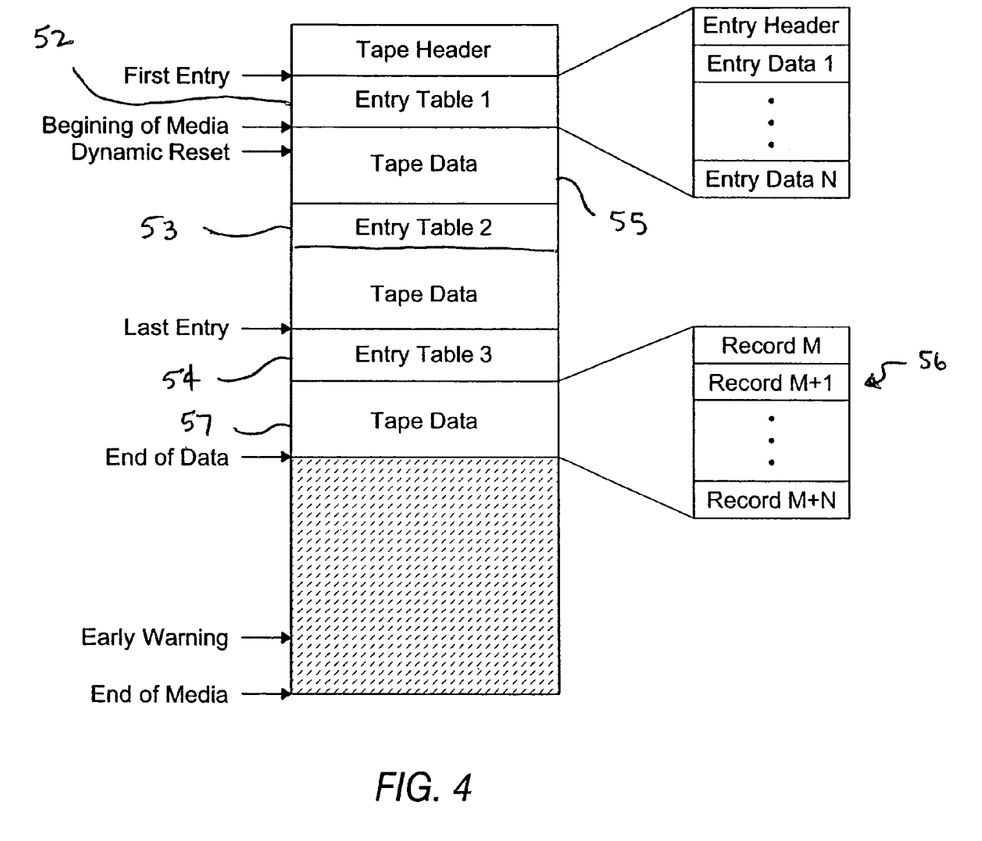
FIG. 4 is an illustration of the data format of a tape emulated on a disk drive storage device.

Thus, one of the functions a virtual tape system should perform is to establish a format on disk for representing the sequential nature and variable logical block length of tape. FIG. 4 is an illustrative embodiment of the present invention comprising a system and method for formatting variable size data records into a fixed block structure while taking advantage of the random access nature of disk drives. The implementation described in this document is for the emulation of a tape drive with a single cartridge, but the implementation is readily extended to the emulation of a tape library with multiple drives and multiple cartridges. We begin by defining the physical layout of the data.

Writing data to a tape usually occurs in one of three modes. Overwrite mode indicates that writing will start at the beginning of tape and any information currently on the tape is considered to be deleted. Overwrite mode can be used for a brand new tape or a used tape that contains data that can be overwritten. Append mode indicates that writing will begin at the end of the data that has been previously written. Thus, the existing data on the tape will be preserved and will remain accessible. Update mode indicates that writing will occur somewhere in the middle of the existing data. All existing data that comes after the initial writing point is considered to be deleted and will no longer be accessible. Any data that comes before the writing point will be preserved and will remain accessible.

Referring now to FIGS. 3 and 4, in one advantageous implementation of the invention, a virtual tape volume corresponding to a logical unit (e.g. the logical unit 46c of FIG. 3) is initially defined by a user of the appliance 18. This virtual tape volume has a particular user selected data storage size. The selected size corresponds to a number of 512 byte hard disk sectors on the hard drive array 42a of FIG. 3 which are "virtually" available for data storage via the storage controller 40, which may comprise a virtual tape interface and logical unit 46c, which is a virtual tape volume. The set of "virtually available" hard disk sectors, along with a few additional sectors storing format information, form an emulated tape on the hard disk media.

In FIG. 4, the top of the diagram (labeled Tape Header 50) corresponds to the first 512 byte sector on a disk used to form this virtual tape, and the bottom of the diagram (labeled End of Media 51) corresponds to the last virtually available 512 byte sector on the disk allocated for this virtual tape. It will be appreciated that the fixed length "sectors" that form the emulated tape may correspond to a set of physical disk sectors on a hard disk drive, but the actual disk sectors on which the data is physically stored need not, and generally will not, correspond to a contiguous and sequential set of sectors in a hard disk drive. It will thus be appreciated that the virtually available sectors may correspond to logical sectors which are mapped using well known techniques onto physical disk drive storage sectors.

This first sector(s) of the virtual tape are used to store a tape header 50. This contains some identification information and high level parameters describing the layout of the data of the virtual tape. The next region on the disk is the first entry table 52. The entry tables 52, 53, 54 contain information for keeping track of the variable length data records that have been stored on the tape. Each entry table 52, 53, 54 may contain space for up to N data entries corresponding to N variable length data records that will be stored in the associated data area. The next region is the first data area 55. This is associated with the first entry table 52 and is where variable length data records will be stored contiguously (such as variable length data records 56 stored in a third data area 57 that are associated with the third entry table 54). The entry tables 52, 53, 54 are limited in size in order to reduce the overhead. If more than N records are written, an additional entry table is appended to the end of the data area. In this way, as data records are written to tape multiple entry tables may be allocated, each having an associated data area that immediately follows.

The tape header 50 contains identification information and high level parameters describing the layout of the data. This structure is defined below:

| Field Type | Name | Description |
| --- | --- | --- |
| CHAR | SIGNATURE[32]; | // ONLY MODIFY AT OPEN |
| BLOCK | TOTALBLOCKS; | // TOTAL RECORDS WRITTEN |
| SECTOR | SECTORBOM; | // BEGINNING OF MEDIA SECTOR |
| SECTOR | SECTOREOM; | // END OF MEDIA SECTOR |
| SECTOR | SECTOREOD; | // END OF DATA SECTOR |
| SECTOR | SECTOREW; | // EARLY WARNING SECTOR |
| SECTOR | LASTENTRY; | // LAST ENTRY TABLE SECTOR |
| UNSIGNED LONG | DRIVETYPE; | |
| UINT64_T | FLAGS; | // EMULATION MODE FLAGS |

The Signature field is a pattern used to determine if a valid header has been written. The TotalBlocks field is to keep track of the number of variable length data records (tape logical blocks) that have been written. The SectorBOM field is the sector corresponding to the beginning of the first data area. We refer to this location as the beginning of media (BOM) and it represents the first sector where user data may be stored. The SectorEOM field is the last available sector for the emulated tape. We refer to this location as the end of media (EOM) and it represents the last sector where user data may be stored. The SectorEOD field is the sector immediately following the end of the last data area. This sector represents the location where appending write operations will start and we refer to this sector as the end of data (EOD). The SectorEW field is the early warning sector. When the EOD moves beyond this point an early warning signal is generated to notify the backup software that there is not much space left on the virtual tape. The LastEntry field holds the sector at the beginning of the last entry table that has been allocated. It represents the current entry table that will be used for the next appending write. The DriveType field indicates the model of tape drive that will be emulated. The Flags field indicates the emulation mode to use. This enables the optional implementation of advanced features that take advantage of the random access nature of disk to provide capabilities that would be difficult or impossible with physical tape drives. Although not shown in the table above, the tape header could also include a tape identifier or serial number.

Figure 5:
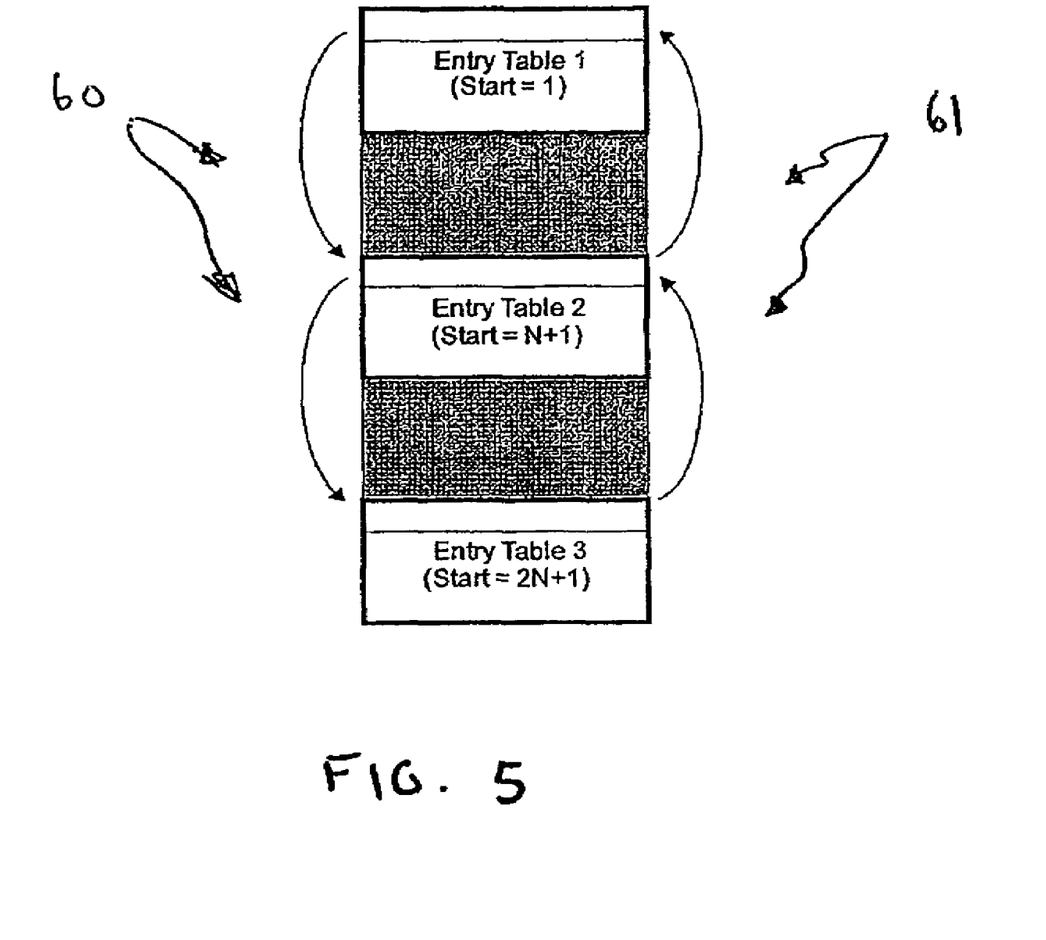
FIG. 5 is an illustration of bi-directional linkage of entry tables.

Referring to FIG. 5, the entry tables form a bidirectional linked list. Thus, given any table as a starting point, such as Entry Table 1, all the other tables can easily be accessed, such as Entry Table 2 or 3. The entry table header contains the forward links 60 and reverse links 61, and information on the range of data records that are accessible using the given entry table. The entry table header is defined below:

| Field Type | Name | Description |
| --- | --- | --- |
| SECTOR | Previous; | // previous entry table |
| SECTOR | Next; | // next entry table |
| BLOCK | Start; | // first block number |

The Previous field is the sector where the previous table in the list begins. The Next field is the sector where the next table in list begins. The Start field is the record number corresponding to the first entry in the table. Referring to FIG. 5, if each table hold N entries, the first table will have Start equal to 1, such as Entry Table 1, the second table will have Start equal to N+1, such as Entry Table 2, the third table will have Start equal to 2N+1, such as Entry Table 3, and so on. Each entry table will contain a series of entry data structures that give information on how to access each corresponding data record.

Figure 6:
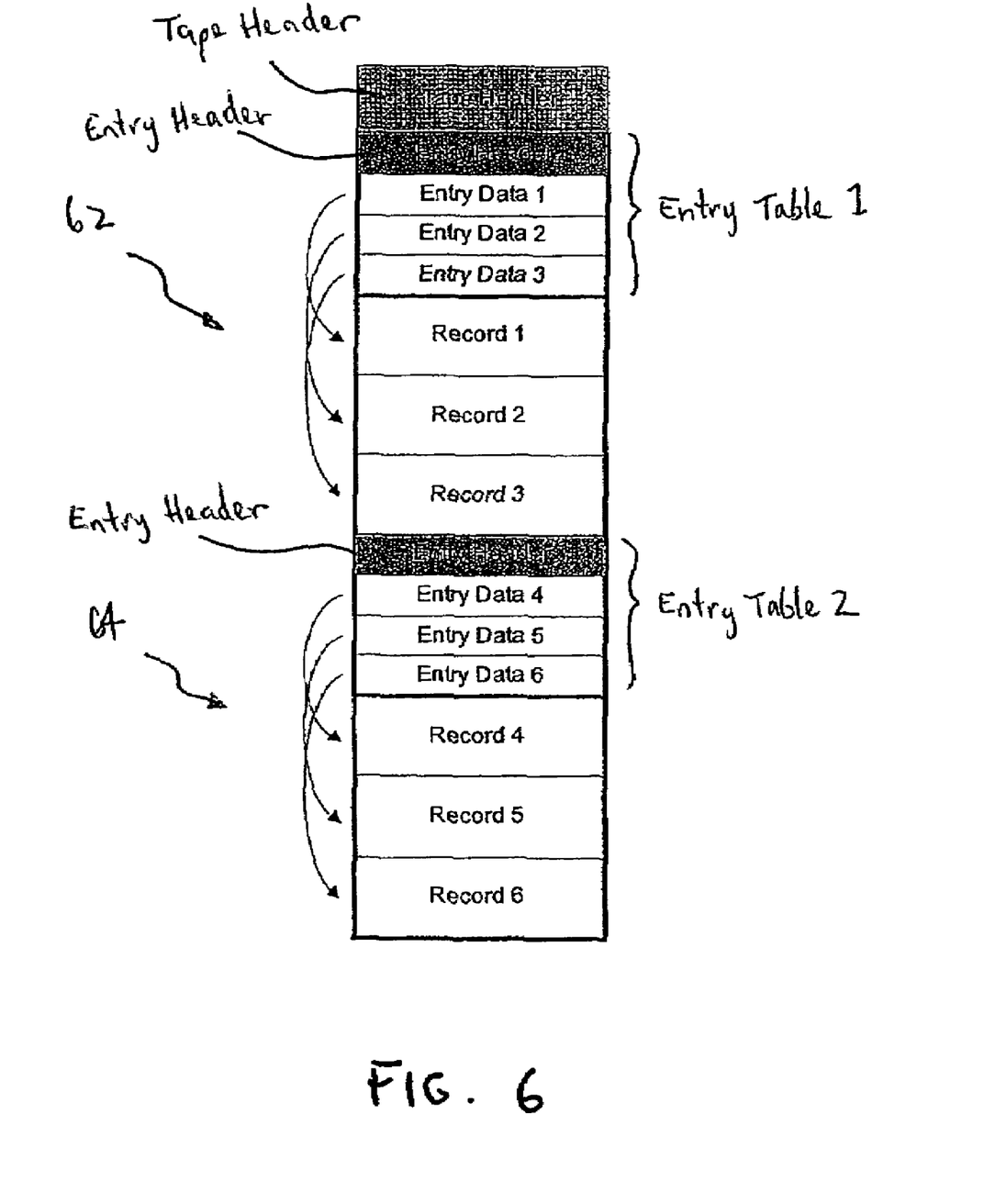
FIG. 6 is an illustration of entry table linkage to entry data and records.

FIG. 6 illustrates the relationship between the entry tables and the data records where in this illustrative embodiment the number of entries in each table in N=3. Referring to FIG. 6, Entry Table 1 comprises Entry Data 1, 2 and 3, wherein each Entry Data has a corresponding forward link 62 to a corresponding Record 1, 2 or 3. Likewise, Entry Table 2 comprises Entry Data 4, 5 and 6, wherein each Entry Data has a corresponding forward link 64 to a corresponding Record 4, 5 or 6. The entry data structure may be defined below:

| Field Type | Name | Description |
| --- | --- | --- |
| SECTOR | Sector; | // Location of data record |
| unsigned char | Size[3]; | // Size of data record |
| unsigned char | Flag; | |

The Sector field is the sector corresponding to the beginning of the data record. The Size field is the size of the data record in bytes. The Flag field gives additional information about the contents of the record. It can be used to indicate special records such as file marks or it could indicate format choices such as whether the record has been compressed or not.

The parameters described above represent information that would be stored with respect to a tape cartridge. Now we go on to discuss the information that relates to the tape drive. Virtual tape drive parameters will generally not be stored on the drive arrays in the appliance, but may be stored in non-volatile memory in the storage controller 40 (FIG. 2). A data structure that describes the tape drive is shown below:

| Field Type | Name | Description |
|---|---|---|
| unsigned | Loaded ; | // tape cartridge loaded? |
| TAPE_HEADER | Header ; | // tape header |
| BLOCK | Block ; | // current block number |
| SECTOR | Sector ; | // current sector location |
| TAPE_ENTRY | *EntryBuffer ; | // current entry table |
| SECTOR | Entry ; | // current entry table sector |
| unsigned | Dirty ; | // header needs to be written? |
| unsigned | DriveLocked ; | // prevent media removal? |
| unsigned | EndOfMedia ; | // reached end of media? |
| unsigned | EarlyWarning ; | // reached early warning point? |
| unsigned | EndOfData ; | // at end of data? |
| unsigned | FileMarkSet ; | // is current block a file mark? |
| char | Sn[TAPE_SN_LEN] ; | // drive serial number |
| MODE_DATA | Mode ; | // drive specific mode parameters |

The Loaded field indicates whether a tape cartridge is loaded in the drive. If a cartridge is loaded, the Header field will contain the header information read from the cartridge. The Block field is the current block number that will be used for read and write commands. The Sector field is the current sector location. This corresponds to the beginning of the data record referenced by the current block number. It is the location where the next read or write will take place if no seek commands are given beforehand. The EntryBuffer field is a copy of the current entry table, which usually contains the entry corresponding to the current block. The Entry field is the sector location of the table loaded in EntryBuffer. The Dirty field indicates that the tape header has been updated but that the updates have not been written to the tape image. The DriveLocked field indicates whether tape cartridge removal is allowed. The EndofMedia field indicates if the current sector is at or beyond the end of media location. The EarlyWarning field indicates if the current sector is at or beyond the early warning location. The EndofData field indicates if the current sector is at end of data location. The FileMarkSet field indicates if the current block is a file mark. The SN field is the serial number of the tape cartridge or tape drive. The Mode field contains drive specific parameters related to the current state of the tape cartridge or tape drive.

Figure 7:
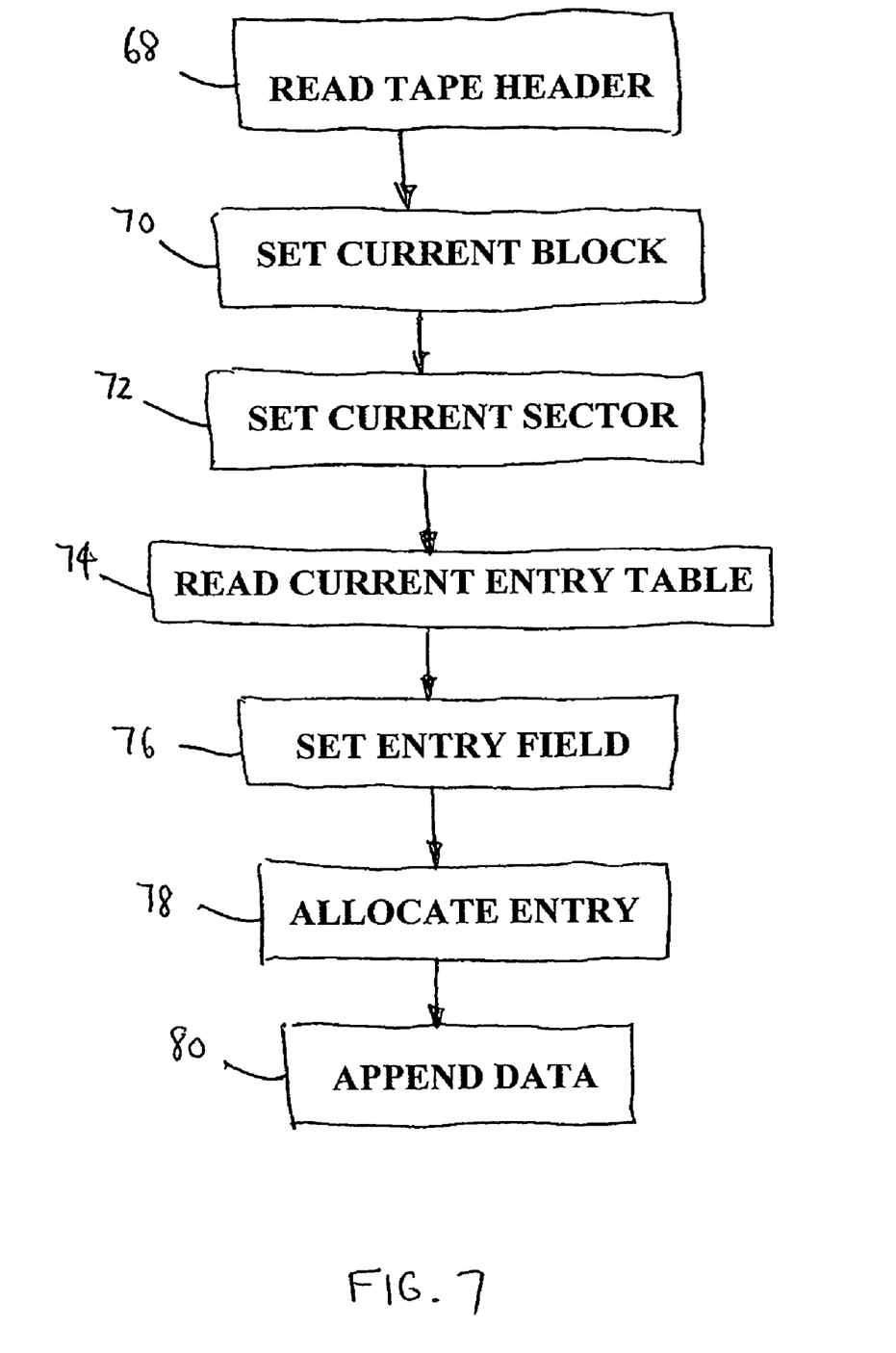
FIG. 7 is a flow chart illustrating an embodiment of the invention performing an append write to a virtual tape.

As an example of the operation of the virtual tape system, consider the situation depicted in the flow chart of FIG. 7 where we load a tape cartridge and perform an append write. When the cartridge is loaded (virtually), the virtual tape header corresponding to the cartridge is read from the media in step 68 and stored in the tape drive structure and the cartridge is initialized to the rewound state. To prepare for an append, the backup software will request a seek to just beyond the last logical block. To achieve this, the current block number is set at step 70 to one plus the total number of blocks, which is stored in the tape header. Next, the current sector is set in step 72 to the end of data, which is also in the tape header. Then the current entry table is loaded in step 74 from the location specified by the last entry in the header and the entry field is set in step 76 to this location. If no entry location is available in the current table, which is specified by the last entry table parameter in the header, a new entry table is allocated. If a new table is required, its location is set as the current end of data location, and the end of data will be incremented by the size of the entry table. The newly allocated entry will set its location field to the current end of data and the size and flag fields will be set.

Then in step 78, an entry in the current entry table will be allocated for use and the data record will be written in step 80. Optionally, the record could be compressed and then the size of the record would be its size after compression since that is what gets written to media. Finally, the end of data location is incremented by the size of the data record and the current block number is incremented and the current sector location is set to the current end of data.

Figure 8:
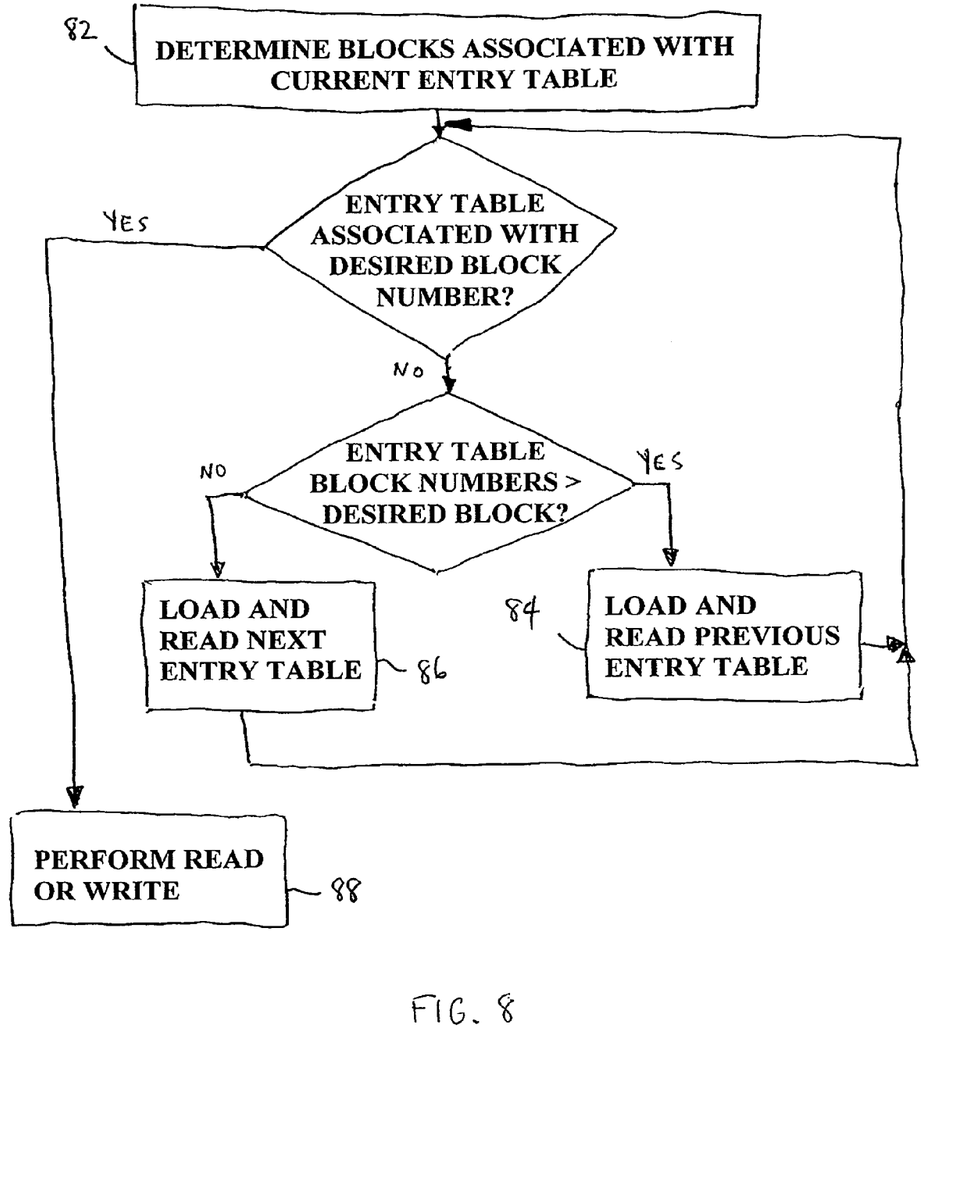
FIG. 8 is a flow chart illustrating an embodiment of the invention performing a search for a desired data record and performing a read or write operation on that data record.

As another example, consider the situation where we wish to read or write over a designated data record that is somewhere in the middle of the data on the cartridge. The current block number is set to the record number we wish to read. Next, we locate the entry table containing the entry that will allow us to read the desired record. As a first step, we check to see if the specified block number has an entry in the current entry table in step 82. To accomplish this we look at the Start field in the current entry table. If the specified block number is greater than or equal to Start and less than Start plus the number of entries the table can hold, then the current table has the desired entry. If the specified block number is less than Start, then we use the Previous field in the current entry table to load the previous entry table into memory in step 84 and this becomes the current entry table. Then we perform our check again to see if the entry is the current table. If not we keep going to previous tables until we have located the correct table. If the specified block number is greater than or equal to Start plus the number of entries the table can hold, then we use the Next field to load the next entry table into memory in step 86. We perform our check again to determine whether we have the correct table, and if not we keep moving forward until we have loaded the correct table. Once we have the correct table, we can use the entry to get the location of the data record and then begin reading or writing over the data record in step 88. The flag in the entry data will tell us whether we have to decompress or not when reading.

The foregoing description details certain preferred embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended Claims and any equivalents thereof.

What is claimed is:

1. A data storage system comprising:
 at least one hard disk drive comprising a magnetic data storage area partitioned into a plurality of data storage sectors;

wherein at least one data storage sector stores virtual tape header data comprising information defining data storage sectors allocated to a virtual tape;

wherein a plurality of data storage sectors allocated to said virtual tape store a plurality of entry tables, each entry table comprising (1) an entry header comprising links to one or more other entry headers associated with said plurality of entry tables, and (2) information defining data storage sectors allocated to one or more individual records associated with said virtual tape; and wherein at least one data storage sector allocated to said individual data records stores at least some of said one or more individual data records.

2. The data storage system of claim 1, wherein said entry table comprises links to one or more data records.

3. The data storage system of claim 1, wherein said virtual tape header comprises data fields defining a beginning of media sector and an end of media sector.

4. The data storage system of claim 1, wherein said virtual tape header comprises data fields defining an early warning sector between said beginning of media sector and an end of media sector.

5. The data storage system of claim 1, wherein at least one of said entry headers stores a forward link to a data storage sector storing a next entry table and a reverse link to a data storage sector storing a previous entry table.

6. A method of appending a record to a virtual tape comprising:

loading virtual tape header information from a data field stored on a hard disk drive;

reading the total number of logical blocks stored on said virtual tape from said virtual tape header;

setting a current block number as one plus the total number of logical blocks stored on said virtual tape;

setting a current sector of said virtual tape to an end of data sector stored in said virtual tape header;

reading a current entry table specified in the virtual tape header, wherein said current entry table comprises a link to an entry header included in a first entry table, said first entry table comprising information defining data storage sectors allocated to one or more individual records associated with said first entry table;

allocating new entry in the first entry table for use, said new entry comprising information identifying said end of data sector, or allocating said new entry as a first entry in a new entry table if no entry location is available in the first entry table;

writing a data record on sectors defined by the allocated entry; and upon allocating the new entry in the new entry table, setting the new entry table as the current entry table, and setting the new entry table as a next entry table specified in the entry header included in the first entry table.

7. The method of claim 6, additionally comprising:

incrementing the end of data sector by a size of the written data record;

incrementing the current block number by the number of logical blocks in the written data record; and setting the current sector location to the incremented end of data sector.

8. The method of claim 6, further comprising:

setting the location of the new entry table as the end of data sector; and incrementing the end of data sector by a size of the data record written in the new entry table.

9. A method of reading or writing over a desired data record at a desired block number on a virtual tape comprising:

determining data storage sectors associated with said desired block number, said determining comprising:

reading a current entry table defining stored block numbers associated with said entry table, said current entry table comprising an entry header comprising links to a previous entry table and a subsequent entry table in a bi-directionally linked list of entry tables associated with the virtual tape;

updating said current entry table with the previous or the subsequent entry table if said desired block number is not associated with said current entry table;

repeating said reading and updating until an entry table associated with said desired block number is stored as said current entry table; and reading said current entry table to identify said data storage sectors; and reading or writing over one or more of said data storage sectors.

10. A method of emulating data storage on a magnetic tape media using one or more hard disk drives, said method comprising:

allocating a set of logical sectors of said one or more hard disk drives to a virtual tape;

allocating a first subset of said set of logical sectors to a plurality of bi-directionally linked tables, wherein each table stores information allocating a second subset of said set of logical sectors to data records stored on said virtual tape, and each table comprises one or more links to a previous entry table and/or a subsequent entry table in the bi-directionally linked list of tables associated with the virtual tape.

* * * * *